United States Patent
Finateu et al.

(10) Patent No.: US 10,469,776 B2
(45) Date of Patent: Nov. 5, 2019

(54) SAMPLE AND HOLD BASED TEMPORAL CONTRAST VISION SENSOR

(71) Applicants: Prophesee, Paris (FR); Consejo Superior de Investigaciones Cientificas, Madrid (ES)

(72) Inventors: Thomas Finateu, Moret sur Loing (FR); Bernabe Linares Barranco, Seville (ES); Teresa Serrano Gotarredona, Seville (ES); Christoph Posch, Bad Fischau (AT)

(73) Assignees: Prophesee, Paris (FR); Consejo Superior de Investigaciones Cientificas, Madrid (ES)

( * ) Notice: Subject to any disclaimer, the term of this patent is extended or adjusted under 35 U.S.C. 154(b) by 0 days.

(21) Appl. No.: 16/090,979

(22) PCT Filed: Apr. 4, 2017

(86) PCT No.: PCT/EP2017/057985
§ 371 (c)(1),
(2) Date: Oct. 3, 2018

(87) PCT Pub. No.: WO2017/174579
PCT Pub. Date: Oct. 12, 2017

(65) Prior Publication Data
US 2019/0141265 A1    May 9, 2019

(30) Foreign Application Priority Data

Apr. 4, 2016  (EP) .................................... 16305391
Oct. 5, 2016  (EP) .................................... 16306310

(51) Int. Cl.
*H04N 5/355*  (2011.01)
*H04N 5/3745* (2011.01)
(Continued)

(52) U.S. Cl.
CPC ......... *H04N 5/3559* (2013.01); *H04N 5/3575* (2013.01); *H04N 5/378* (2013.01); *H04N 5/3745* (2013.01); *H04N 5/37455* (2013.01)

(58) Field of Classification Search
CPC ............ H04N 5/3559; H04N 5/37455; H04N 5/3745; H04N 5/378; H04N 5/3575
See application file for complete search history.

(56) References Cited

U.S. PATENT DOCUMENTS

| 7,728,269 B2 | 6/2010 | Lichtsteiner et al. | |
| 8,946,615 B2 * | 2/2015 | Deguchi ................ | H04N 5/378 250/208.1 |

(Continued)

FOREIGN PATENT DOCUMENTS

| EP | 2 717 466 A1 | 4/2014 |
| EP | 2717466 | 4/2014 |
| EP | 2 933 995 A1 | 10/2015 |

OTHER PUBLICATIONS

International Search Report dated Jun. 20,2017, in corresponding International Application No. PCT/EP2017/057985; 4 pages.

(Continued)

*Primary Examiner* — Luong T Nguyen
(74) *Attorney, Agent, or Firm* — Finnegan, Henderson, Farabow, Garrett & Dunner LLP

(57) ABSTRACT

This invention relates to a pixel circuit comprising a photosensor stage comprising a photodiode delivering a photoreceptor current, a comparison stage configured for detecting a change in a signal voltage derived from said photoreceptor current, a sample-and-hold circuit connected to the converting stage and to the comparison stage, said comparison stage configured to output an input signal for the sample-and-hold circuit, and for emitting a sampling signal to a control terminal of the sample-and-hold circuit when a change is detected in the signal voltage.

20 Claims, 11 Drawing Sheets

(51) Int. Cl.
*H04N 5/357* (2011.01)
*H04N 5/378* (2011.01)

(56) References Cited

U.S. PATENT DOCUMENTS

| | | | | |
|---|---|---|---|---|
| 9,374,545 | B2* | 6/2016 | Fowler | H03F 3/16 |
| 9,544,507 | B2* | 1/2017 | Serrano Gotarredona | H04N 5/243 |
| 9,681,081 | B2* | 6/2017 | Serrano Gotarredona | H03F 1/086 |
| 2009/0167915 | A1* | 7/2009 | Hirota | H04N 5/357 348/302 |
| 2010/0182468 | A1 | 7/2010 | Posch et al. | |
| 2015/0001379 | A1 | 1/2015 | Moro | |

OTHER PUBLICATIONS

Written Opinion dated Jun. 20, 2017, in corresponding International Application No. PCT/EP2017/057985; 5 pages.

Patrick Lichtsteiner et al., "A 128 128 120 dB 15 □ s Latency Asynchronous Temporal Contrast Vision Sensor," *IEEE Journal of Solid-State Circuits*, vol. 43, No. 2 (2008), 11 pages.

Oliver Landolt et al., "Visual sensor with resolution enhancement by mechanical vibrations," published in Proceedings 2001 Conference on Advanced Research in VLSI, Salt Lake City, UT, 2001 (16 pages).

Jorg Kramer, "An Integrated Optical Transient Sensor," published in *IEEE Transactions on Circuits and Systems*, vol. 49, No. 9, New York, NY, 2002 (17 pages).

Patrick Lichtsteiner et al., "A 128×128 120dB 30mW Asynchronous Vision Sensor that Responds to Relative Intensity Change," published in *2006 IEEE International Solid State Circuits Conference—Digest of Technical Papers*, San Francisco, CA, 2006 (10 pages).

Patrick Lichtsteiner et al., "A 128 128 120 dB 15 µs Latency Asynchronous Temporal Contrast Vision Sensor," published in *IEEE Journal of Solid State Circuits*, vol. 43, No. 2, 2008 (11 pages).

Christoph Posch et al., "A QVGA 143dB Dynamic Range Asynchronous Address-Event PWM Dynamic Image Sensor with Lossless Pixel-Level Video Compression," published in *2010 IEEE International Solid-State Circuits Conference*, San Francisco, CA, 2010 (3 pages).

Juan Antonio Leñero-Bardallo et al., "A 3.6 µs Latency Asynchronous Frame-Free Event-Driven Dynamic-Vision-Sensor," published in *IEEE Journal of Solid State Circuits*, vol. 46, No. 6, 2011 (13 pages).

Teresa Serrano-Gotarredona and Bernabé Linares-Barranco, "A 128 128 1.5% Contrast Sensitivity 0.9% FPN 3 µs Latency 4 mW Asynchronous Frame-Free Dynamic Vision Sensor Using Transimpedance Preamplifiers," published in *IEEE Journal of Solid State Circuits*, vol. 48, No. 3, 2013 (12 pages).

Raphael Berner et al., "A 240×180 10mW 12us Latency Sparse-Output Vision Sensor for Mobile Applications," published in *2013 Symposium on VLSI Circuits Digest of Technical Papers*, Kyoto, Japan, 2013 (2 pages).

* cited by examiner

SAMPLE AND HOLD BASED TEMPORAL CONTRAST VISION SENSOR

CROSS-REFERENCE TO RELATED APPLICATIONS

The present application is a U.S. National Stage Filing under 35 U.S.C 0 371 and claims priority from International Application No. PCT/EP2017/1057985, filed on Apr. 4, 2017, which claims priority to European Patent Application No. 16306310.0, filed on Oct. 5, 2016, and to European Patent Application No. 16305391.1, filed on Apr. 4, 2016. The entirety of each are incorporated herein by reference.

The invention relates to a pixel circuit for an image sensor for temporally differentiating photo-sensing systems (i.e. temporal contrast sensors), especially for low-consumption reduced-area analogue integrated circuits for photo-sensing applications.

In conventional video cameras, the apparatus records photogram after photogram. In temporal contrast sensors, there are no photograms. Like in video cameras, the integrated circuit contains a photo sensor matrix. However, in conventional video cameras, each photo sensor is sampled at a fixed frequency, whereas in temporal contrast sensors, pixels are not sampled: each pixel calculates the time derivative of the light it senses, optionally performs some processing on this derivative, and when the calculated quantity exceeds a defined level or threshold, the pixel generates an "event" and transmits information related to this event.

The transmitted information usually consists of the x,y-coordinate of the pixel within the two-dimensional photo sensor matrix, together with a sign bit 's' to indicate whether the light intensity has increased or decreased. In this way, the output of temporal contrast sensor consists of a flow of (x,y,s) coordinates with sign bit of the various pixels that detect a relative change in the light intensity they sense.

This concept was reported for the first time in Landolt et al. 'Visual sensor with resolution enhancement by mechanical vibrations', in Proc. 19th Conf. Advanced Research in VLSI, Salt Lake City, Utah, pp. 249-264, 2001, and J. Kramer 'An integrated optical transient sensor, in IEEE Transactions on Circuits and Systems, Part-II: Analog and Digital Signal Processing, vol. 49, No. 9, pp. 612-628, September 2002.

However, these implementations suffered from high inter-pixel mismatch, resulting in low temporal contrast sensitivity. Later on, an improved sensitivity sensor was reported in Lichtsteiner, Posch and Delbruck, 'A 128×128 120 dB 30 mW Asynchronous vision sensor that responds to relative intensity change' in Solid-State Circuits, 2006 IEEE International Conference ISSCC, Dig of Tech Paper, pp. 2060-2069, February 2006 and subsequently in more detail in P. Lichtsteiner et al. 'A 128×128 120 dB 15 µs latency asynchronous temporal contrast vision sensor' in IEEE J. Solid-State Circuits, vol. 43, No. 2, pp. 566-576, February 2008 and in U.S. Pat. No. 7,728,269.

In 2010, Posch et al. 'A QGVA 143 dB dynamic range asynchronous address event PWM dynamic image sensor with lossless pixel level video compression' in Solid-State Circuits, 2010 IEEE International Conference ISSCC, Dig of Tech Paper, pp. 400-401, February 2010, and U.S. 2010/0182468, reported a new prototype.

In 2011, J. A. Leriero-Bardallo et al. 'A 3.6 µs Asynchronous frame free event-driven dynamic vision sensor' in IEEE J. of Solid-State Circuits, vol. 46, No. 6, pp. 1443-1455, February 2010, reported an attempt to boost temporal contrast sensitivity by means of adding a voltage preamplifier, but this deteriorated mismatch and introduced very high power consumption.

In 2013, T. Serrano-Gotarredona et al. 'A 128×128 1.5% Contrast Sensitivity 0.9% 3 µs Latency 4 mW Asynchronous Frame-Free Dynamic Vision Sensor Using Transimpedance Amplifiers,' in IEEE J. Solid-State Circuits, vol. 48, No. 3, pp. 827-838, March 2013, and EP2717466 reported an alternative low-power low-mismatch technique to boost temporal contrast sensitivity by means of transimpedance amplifiers and diode-connected transistors.

In these temporal contrast sensors, the photocurrent $I_{ph}$, sensed by a photo-sensor is firstly transformed into voltage by means of a logarithmic conversion with voltage amplification. Subsequently its time derivative is calculated, and some additional processing may be performed. FIG. 1 illustrates a comprehensive diagram illustrating dedicated stages performing these steps. A photodiode 1 provides a photocurrent, typically in the range of fractions of pico amperes (pA) up to about hundreds of pA, This photocurrent is fed to a converting stage 2 constituted by a logarithmic current-to-voltage converter providing a voltage proportional to the logarithm of the photocurrent $I_{ph}$. Typically, a voltage amplification stage 3 of gain A), amplifies the converted voltage, resulting in a signal voltage $V_{ph}$ according to the following formula:

$$V_{ph}=A_v V_o \log(I_{ph}/I_o) \quad \text{(eq. 1)}$$

It has been shown that parameters $A_V$ and $I_o$ suffer from inter-pixel mismatch when this circuit is used in an array of pixels to produce a camera sensor. Parameter $V_o$ is typically dependent on physical constants which are the same for ail pixels, Signal voltage $V_{ph}$ is then typically fed into a time derivative circuit 4 which provides an output proportional to the derivative of the signal voltage $V_{ph}$:

$$\frac{dV_{ph}}{dt} = A_v V_o \frac{1}{I_{ph}} \frac{dI_{ph}}{I_{ph}} \quad \text{(eq. 2)}$$

Here, the mismatch rich parameter $I_o$ has been cancelled, but gain parameter $A_v$ remains. In reported state-of-the-art temporal contrast cameras, this inter-pixel mismatch sensitive parameter is either (i) of unity gain, as shown in U.S. Pat. No. 7,728,269 and U.S. 2010/0182468, or (ii) of a higher gain (see J. A. Leriero-Bardallo, et al., 2011, supra and T. Serrano-Gotarredona et al., 2013, supra).

FIG. 2 shows an exemplary embodiment of such a time derivative circuit 4. The time derivative of signal voltage $V_{ph}$ can be easily obtained by sensing the current through a capacitor 6 whose terminal voltage difference is set to signal voltage $V_{ph}$. The capacitor is connected to the inverting input of a differential amplifier 8. A feedback element 7 connects said inverting input of the differential amplifier 8 and the output of said differential amplifier 8. The non-inverting input of the differential amplifier 8 is grounded The current $I_D$ flowing through the capacitor 6 is given by $I_D = C\, dV_{ph}/dt$. Depending on the nature of the feedback element 7, one can make use of the time-derivative of the signal voltage $V_{ph}$ in different ways. For example, in the case the feedback element 7 is a resistor, output voltage $V_D$ would be proportional to current $I_D$, and thus proportional to the time-derivative of the signal voltage $V_{ph}$. The time-derivative of the signal voltage $V_{ph}$ can be used directly to determine the relative change of light in a pixel, since said time derivative of the signal voltage $V_{ph}$ is normalized with respect to light, thus providing a measure of temporal contrast.

It is also possible to post-process this time derivative of the signal voltage $V_{ph}$ with a post-processing circuit 5, for example in order to obtain an accumulated computation of this time-derivative of the signal voltage $V_{ph}$. This is for example the case in U.S. Pat. No. 7,728,269, U.S. 2010/0182468, J. A. Leilero-Bardallo, et al., 2011, supra, or in T. Serrano-Gotarredona et al., 2013, supra, where the post-processing circuit 5 consists of an integrate-and-reset circuit, as shown in FIG. 3.

In the integrate-and-reset circuit of FIG. 3, the capacitor 7a of capacitance together with a reset switch 7b is the feedback element 7 of FIG. 2, and a capacitor 6 of capacitance $C_1$ is the derivative circuit 4 providing the current $I_D$ proportional to the time-derivative of the signal voltage $V_{ph}$. The current $I_D$ is integrated by capacitor 7a, and the output voltage $V_D$ at the output of the differential amplifier 8 provides an integrated version of the current $I_D$. Once the output voltage $V_D$ reaches a given threshold, the charge on capacitor 7a is reset (i.e. made zero), thus resetting the output voltage $V_D$ to a resting level. This way, the integrate-and-reset circuit provides an output signal that is the temporal reset signal.

As shown in FIG. 3, the complete circuit uses two capacitors 6, 7a which need to be properly matched, thus being mismatch-sensitive. In practice, this circuit can be used to introduce an additional gain for the difference contrast computation. This is achieved by making the ratio of the capacitances $C_1/C_2$ be larger than unity. However, this has a negative impact on integrated circuit implementation because capacitance is proportional to device area. Therefore, in order to realize a large ratio, two capacitors are required, one of them of area much larger than the other. This results in an overall area penalty for the pixel, with increasing sensor device area and cost. Accordingly, the solution proposed by the prior art are not satisfactory and there is still a need of improved pixel circuit configuration.

SUMMARY OF THE INVENTION

The present invention provides solutions that overcome most of the above drawbacks. In particular, the invention exploits a mismatch-insensitive single-capacitor Sample-And-Hold circuit to perform the temporal differencing, as opposed to the mismatch-sensitive dual-capacitor integrate-and-reset circuit used in prior art approaches.

The invention proposes a pixel circuit comprising:
a photo-sensor stage comprising a photodiode and having an output, said photo-sensor stage configured for delivering a photoreceptor current dependent on a light intensity of an exposure of said photodiode,
a comparison stage configured for detecting a change in a signal voltage derived from said photoreceptor current, wherein the pixel circuit comprises a sample-and-hold circuit having an input, an output, and a control terminal, the output of said sample-and-hold circuit connected to an input of the comparison stage, and the comparison stage is configured to output an input signal for the input of the sample-and-hold circuit, wherein the control terminal of the sample-and-hold circuit is connected to the comparison stage, said comparison stage configured for emitting a sampling signal to the control terminal of the sample-and-hold circuit when a change is detected in the signal voltage.

Other preferred, although non limitative, aspects of the pixel circuit of the Invention are as follows, isolated or in a technically feasible combination:
the sample-and-hold circuit is configured for sampling the input signal at the input of said sample-and-hold circuit when the comparison stage emits the sampling signal to the control terminal of the sample-and-hold circuit, and for holding a hold voltage when the comparison stage does not emit the sampling signal to the control terminal of the sample-and-hold circuit;
the sample-and-hold circuit is configured so that the hold voltage at the output of said sample-and-hold circuit follows the input signal at the input of said sample-and-hold circuit when the sampling signal is received at the control terminal of the sample-and-hold circuit;
the comparison stage is configured for comparing the signal voltage against at least one threshold voltage, and the comparison stage is configured for emitting the sampling signal to the control terminal of the sample-and-hold circuit on the basis of the comparison between the signal voltage and said at least one threshold voltage;
the comparison stage is configured for comparing the signal voltage against a first threshold voltage and a second threshold voltage, said first threshold voltage being greater than said second threshold voltage, and for outputting a first signal event signal when the signal voltage exceeds the first threshold voltage and for outputting a second event signal when the signal voltage is inferior to the second threshold voltage;
the comparison stage comprises a differential amplifier configured to compare the signal voltage to a reference voltage and to output an input signal for the input of the sample-and-hold circuit on the basis of this comparison;
the comparison stage comprises a differential comparator with multiple shifted outputs, said differential comparator having as inputs two differently amplified values of the signal voltage, and being configured for outputting the input signal for the input of the sample-and-hold circuit and for comparing the difference of the inputs with at least one threshold voltage;
a first amplified signal voltage is applied to an inverting input of the differential comparator, a second amplified signal voltage is applied to a non-inverting input of the differential comparator, and the differential comparator has at least three outputs:
a first output that transitions when the second amplified signal voltage and the first amplified signal voltage differ by a positive threshold voltage,
a second output that transitions when the second amplified signal voltage and the first amplified signal voltage differ by a negative threshold voltage,
a third output is the input signal for the input of the sample-and-hold circuit and transitions when the first amplified signal voltage and the second amplified signal voltage are equal;
the comparison stage comprises at least one series of diode-connected transistors, each series of diode-connected transistors having a gate of a first diode-connected transistor as an input and a drain of said first diode-connected transistor as an output;
the at least one series of diode-connected transistors is arranged between a first terminal configured to apply a first biasing voltage and a second terminal configured to apply a second biasing voltage, and wherein the pixel circuit comprises a biasing circuit for generating at an output terminal at least one biasing voltage among the first biasing voltage and the second biasing voltage, said biasing circuit comprising:
a current source connected to the output terminal,
a series of diode-connected transistors connected to the current source and the output terminal;
the series of diode-connected transistors is arranged between the first terminal and the second terminal, and the current source is connected to the second terminal, and the biasing circuit further comprises a differential amplifier having a inverting input, a non-inverting input and an output, said inverting input connected to a drain of a transistor of said series of diode-connected transistors, a reference voltage applied to said non-inverting input and the output connected to the first terminal;
the comparison stage comprises at least one first series of diode-connected transistors and a second series of diode-connected transistors, each series of diode-connected transistors having a gate of a first diode-connected transistor as an input and a drain of said first diode-connected transistor as an output, and
wherein the comparison stage comprises a differential comparator with multiple shifted outputs, a first input of the differential amplifier being the output of the first transistor of a series of diode-connected transistors and a second input for the differential amplifier being the output of the first transistor of another series of diode-connected transistors;
the output of the sample-and-hold circuit is connected to a gate of a transistor of the first series of diode-connected transistors;
the output of the sample-and-hold circuit is connected to the source of a transistor arranged at an end of the first series of diode-connected transistors, and wherein the output of the photo-sensor stage is connected to the gate of said transistor;
the pixel circuit comprises a converting stage having at least an input connected to the output of the photo-sensor stage and a first terminal, said converting stage configured for delivering on the first terminal the signal voltage derived from said photoreceptor current, and the converting stage has at least a second terminal and the output of said sample-and-hold circuit is connected to the second terminal of the converting stage, said converting stage being an input for the comparison stage;
the second terminal of the converting stage is configured for controlling a voltage shift at the first terminal of the converting stage through a hold voltage applied by the sample-and-hold circuit at the output of said sample-and-hold circuit;
the photo-sensor stage comprises a current mirror and the converting stage comprises at least one diode-connected transistor connected to said current mirror;
the converting stage comprises a series of diode-connected transistors between the output of the photo-sensor stage and the output of the sample-and-hold circuit.

The invention also relates to an image sensor comprising a plurality of pixel circuits according to any one of the possible embodiments.

BRIEF DESCRIPTION OF THE DRAWINGS

Other aspects, objects and advantages of the present invention will become better apparent upon reading the following detailed description of preferred embodiments thereof, given as non-limiting examples, and made with reference to the appended drawings wherein:

FIG. 20b shows a schematic diagram for a possible biasing circuit for stacked diode-connected transistors such as in FIG. 20a.

In the different figures, same reference numbers refer to similar elements.

DETAILED DESCRIPTION OF THE INVENTION

Figure 1:
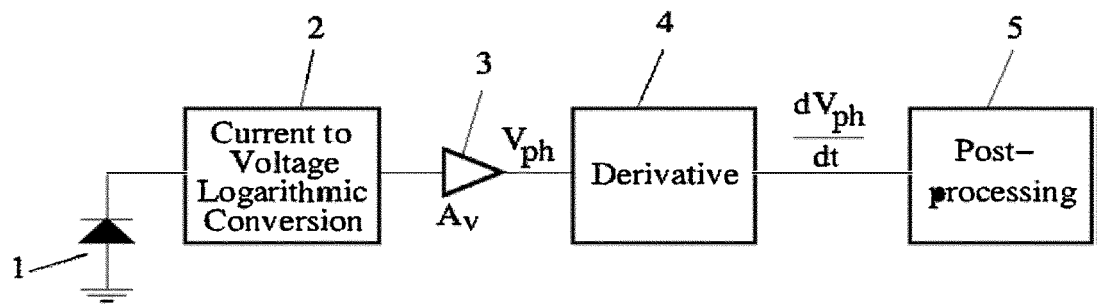
FIG. 1, already discussed, illustrates a schematic diagram of the stages of a temporally differentiating pixel circuit according to prior art.
Figure 2:
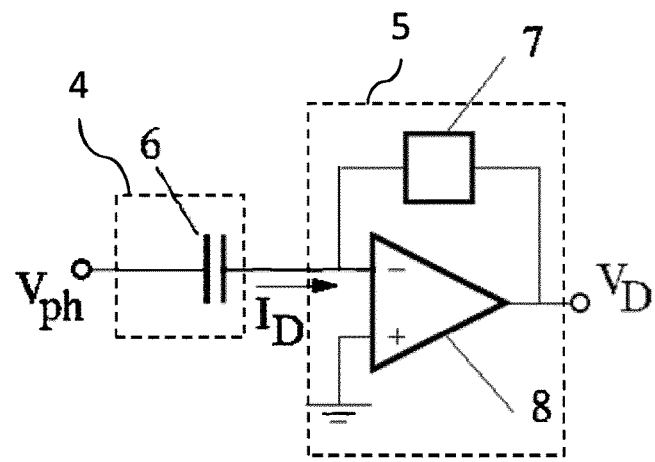
FIG. 2, already discussed, illustrates a schematic diagram of a time derivative circuit.
Figure 3:
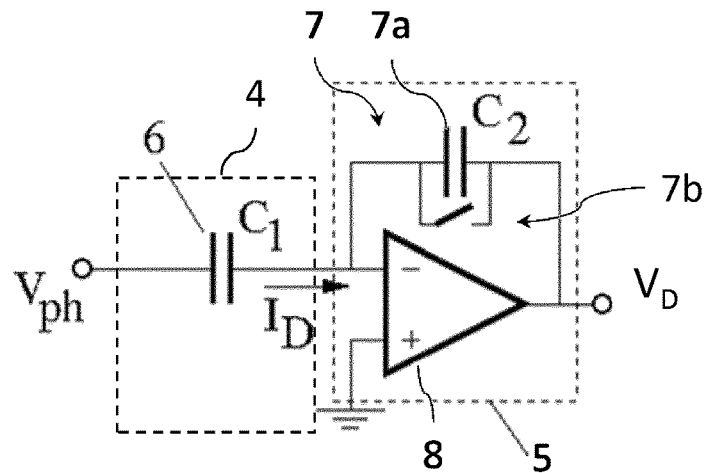
FIG. 3, already discussed, illustrates an integrate-and-reset circuit used in a temporally differentiating pixel circuit according to prior art.
Figure 4:
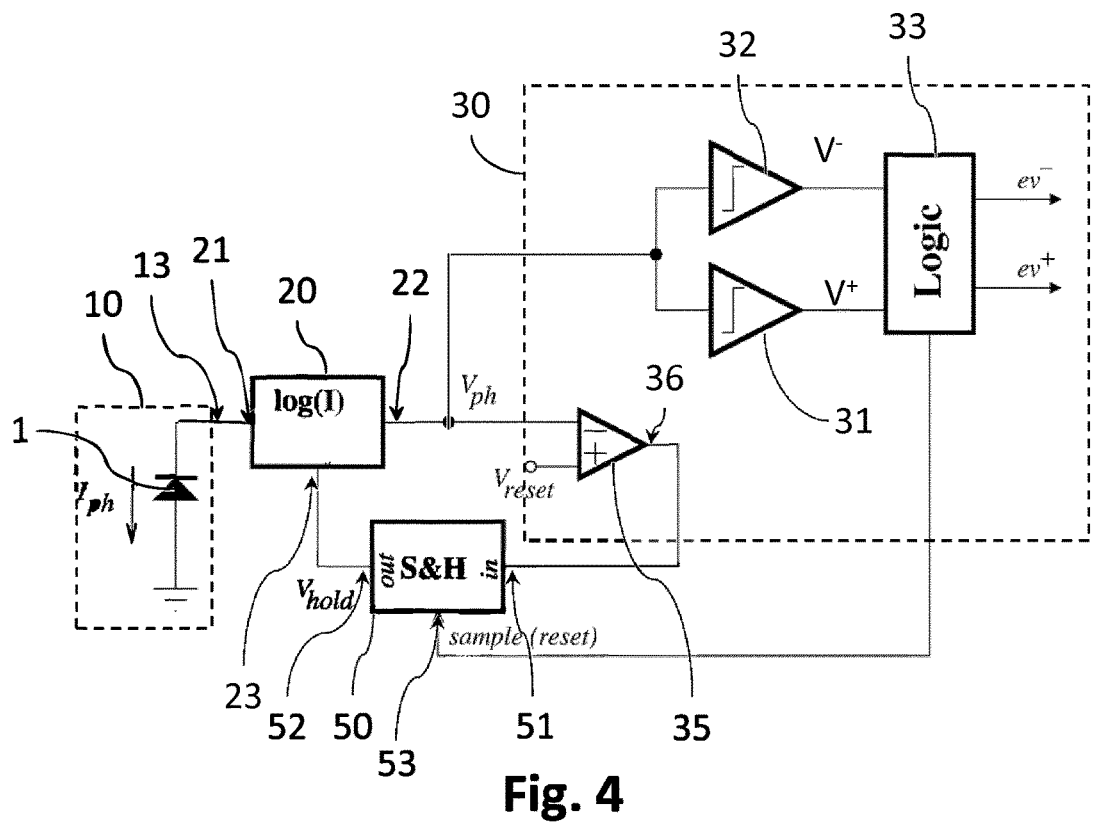
FIGS. 4-9 illustrate schematic diagrams of pixel circuits according to possible embodiments of the invention.

As shown in FIG. 4, the pixel circuit comprises a photo-sensor stage 10, a converting stage 20 and a comparison stage 30. The photo-sensor stage 10 comprises a photodiode 1 and is configured for delivering a photoreceptor current $I_{ph}$ dependent on a light intensity of an exposure of said photodiode. The converting stage 20 has at least an input 21 connected to the output of the photosensor stage 10, a first terminal 22, and a second terminal 23. The converting stage acts as an input for the comparison stage 30.

The converting stage 20 is configured for delivering on the first terminal 22 a signal voltage $V_{ph}$ derived from said photoreceptor current $I_{ph}$. Typically, the converting stage 20 is a logarithmic current to voltage conversion circuit that converts the photoreceptor current $I_{ph}$ into a signal voltage $V_{ph}$ proportional to the logarithm of said photoreceptor current $I_{ph}$.

In the comparison stage 30, the signal voltage $V_{ph}$ is compared against at least one threshold voltage in order to detect a change of voltage corresponding to a change in light intensity of the exposure of the photodiode 1. In the depicted embodiment, the comparison stage 30 is configured for comparing the signal voltage $V_{ph}$ against a first threshold voltage and a second threshold voltage, said first threshold voltage being greater than said second threshold voltage.

To this purpose, two voltages comparators 31, 32 are provided, each inputting the signal voltage $V_{ph}$. A first voltage comparator 31 compares the signal voltage $V_{ph}$ to the first threshold voltage, while a second voltage comparator 32 compares the signal voltage $V_{ph}$ to the second threshold voltage. The first voltage comparator 31 outputs a first enabling signal $V^+$ when the signal voltage $V_{ph}$ exceeds the first threshold voltage, whereas the second voltage comparator 32 outputs a second enabling signal $V^-$ when the signal voltage $V_{ph}$ is below the second threshold voltage.

The first threshold voltage and the second threshold voltage Correspond to the limits of the variation range of the signal voltage $V_{ph}$. Their values may be equally distant from the mean value of said range. For instance, if the mean value of the variating range of the signal voltage $V_{ph}$ is the value of a reference voltage $V_{reset}$, the first threshold voltage may be $V_{reset}+\Delta V$, and the second threshold voltage may be $V_{reset}-\Delta V$, with $\Delta V$ a constant voltage value. However, other configurations are possible, for example with a first constant value $V_{dp}$ added to the reference voltage $V_{reset}$ for the first threshold and a second constant value $-V_{dn}$, different from the first one, added to the reference voltage $V_{reset}$ for the second threshold.

The outputs of the voltage comparators 31, 32 are fed to a logic circuitry 33 that outputs a first signal event signal ev$^+$ when the first voltage comparator 31 outputs an enabling signal $V^+$, i.e. when the signal voltage $V_{ph}$ exceeds the first threshold voltage, and outputs a second event signal ev$^-$ when the second voltage comparator 32 outputs an enabling signal $V^-$, i.e. when the signal voltage $V_{ph}$ is inferior to the second threshold voltage.

The comparison stage 30 also comprises a differential amplifier 35 configured to compare the signal voltage $V_{ph}$ to a reference voltage $V_{reset}$. The differential amplifier 35 takes the signal voltage $V_{ph}$ on its inverting input and the reference voltage $V_{reset}$ on its non-inverting input. As will be explained below, the value of the reference voltage $V_{reset}$ may correspond to the mean value of the range of variation of the signal voltage $V_{ph}$. The skilled person may therefore choose the value that suits best the operational voltages of the pixel circuit.

The pixel circuit also comprises a sample-and-hold (S&H) circuit 50 having an input 51, an output 52, and a control terminal 53. The input 51 of the sample-and-hold circuit 50 is connected to the output 36 of the differential amplifier 35 of the comparator stage 30, the output 52 of the sample-and-hold circuit 50 is connected to the second terminal 23 of the converting stage 20, and the control terminal 53 of the sample-and-hold circuit 50 is connected to the comparison stage 30, more precisely to the logic circuitry 33 of said comparison stage 30.

The sample-and-hold circuit 50 is an analogue device that samples the voltage applied at its input 51 when commanded by the signal applied on the control terminal 53, and holds the sampled value at its output 52. It shall be noted that the voltage at the output 52 of the sample-and-hold circuit 50 does not need to be a precise replica of the voltage at the input 51 during the sampling. It just needs to monotonically follow the voltage input 51 when sampling, and can allow tier voltage shift, plus a voltage attenuation or a voltage amplification.

Figure 5:
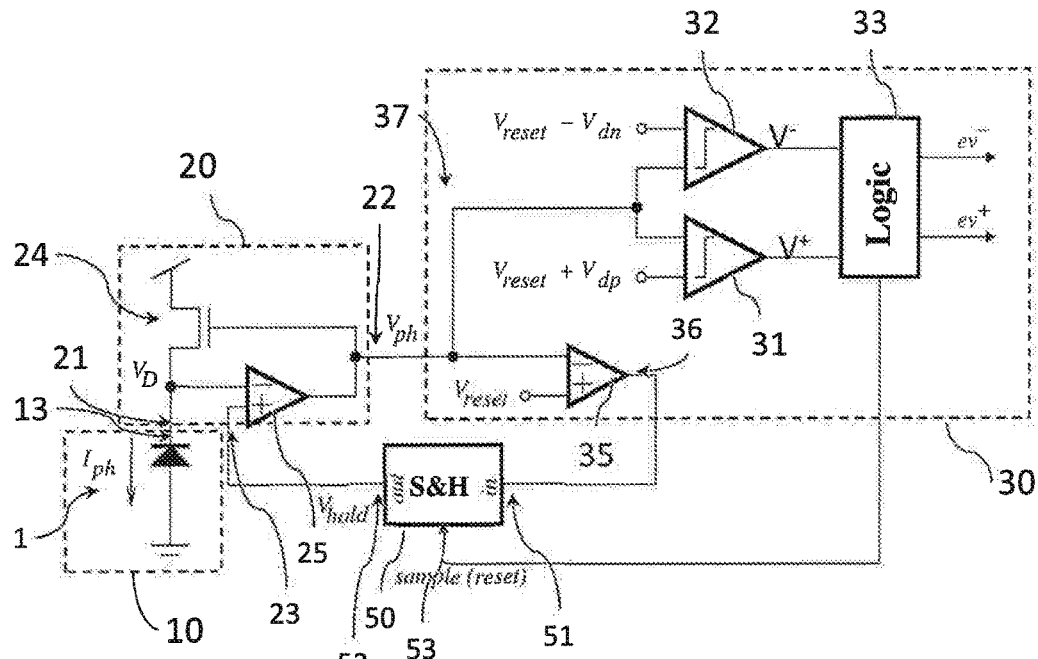

Operating of such a pixel circuit is now explained in relation with the exemplary embodiment of FIG. 5. In this FIG. 5, the converting stage 20 comprises one transistor 24 such as an N-MOSFET and one differential amplifier 25. The drain of the transistor is connected to the output of the photodiode 1 and to the inverting input of the differential amplifier 25. The non-inverting input of the differential amplifier 25 is connected to the output 52 of the sample-and-hold circuit 50, and consequently constitutes the second terminal 23 of the converting stage. The output of the differential amplifier 25 and the gate of the transistor 24 are connected and this common node constitutes the first terminal 22 of the converting stage 20.

The second terminal 23 of the converting stage is used for controlling a voltage shift at the output of the converting stage 20, i.e. at the first terminal 22 of said converting stage 20. The output 52 of the sample-and-hold circuit 50 is therefore used for controlling the voltage shift at the output of the converting stage 20.

The sample-and-hold circuit 50 is most of the time in holding mode, maintaining constant its output at a hold voltage $V_{hold}$ applied to the second terminal 23 of the converting stage 20. Under these circumstances, the differential amplifier 25 of the converting stage 20 maintains the photodiode voltage $V_D$, i.e. the voltage at the output of the photodiode 1, equal to the hold voltage $V_{hold}$, and provides the signal voltage $V_{ph}$ equal to:

$$V_{ph}=V_{hold}+nU_T\log(I_{ph}/I_o)$$

where $I_o$ is a mismatch-rich transistor parameter, n is a low-mismatch transistor parameter called "subthreshold slope factor" and $U_T$ is a mismatch-free physical temperature dependent constant called "thermal voltage".

The signal voltage $V_{ph}$ is continuously monitored by the two voltage comparators 31, 32 and compared against the two voltage thresholds: first voltage threshold $V_{reset}+V_{dp}$ and second voltage threshold $V_{reset}-V_{dn}$. If the latter is reached by the signal voltage $V_{ph}$, a negative output event ev$^-$ is generated by the comparison stage, i.e. by the logic circuitry 33. If the former is reached by the signal voltage $V_{ph}$, a positive output event ev$^+$ is generated by the comparison stage, i.e. by the logic circuitry 33.

In either case, the comparison stage 30 emits a sampling signal to the control terminal 53 of the sample-and-hold circuit 50. The sending of the sampling signal by the comparison stage 30 to the sample-and-hold circuit 50 is thus based on the result of a comparison between the signal voltage $V_{ph}$ and at least one threshold voltage. This sampling signal applied to the control terminal 53 of the sample-and-hold circuit 50 resets said sample-and-hold circuit 50: while the sampling signal (or reset signal) is active, the output of the differential amplifier 35 of the comparison stage 30 is sensed by the sample-and-hold circuit 50, which provides as an output a hold voltage $V_{hold}$ that will follow the voltage at the input 51 of the sample-and-hold circuit 50.

During this active sampling interval, a closed loop is formed between the output 52 of the sample-and-hold circuit 50 and the input 51 of the sample-and-hold circuit 50, through the converting stage 20 and the comparison stage 30. As in the depicted case, the closed loop formed by the sample-and-hold circuit 50 and by the two differential amplifiers, i.e. the differential amplifier 25 of the converting stage 20 and the differential amplifier 35 of the comparison stage 30, will settle to a "reset" state in which the signal voltage $V_{ph}$ equals the reference voltage $V_{reset}$, while the hold signal $V_{hold}$ will be updated such that:

$$V_{hold}|_{new}=V_{reset}-nU_T\log(I_{ph}/I_o)$$

In this manner, the change $\Delta V_{hold}$ in the hold voltage $V_{hold}$ or the change $\Delta V_{ph}$ in the signal voltage $V_{ph}$ between two consecutive resets of the sample-and-hold circuit 50 is such that:

$$\Delta V_{hold} = \Delta V_{ph} = nU_T \Delta \log\left(\frac{I_{ph}}{I_o}\right) = nU_T \log\frac{I_{ph}(t+\Delta t)}{I_{ph}(t)} \approx nU_T \frac{\Delta I_{ph}}{I_{ph}}$$

Between two consecutive resets, the signal voltage $V_{ph}$ changes between the value of the reference voltage $V_{reset}$ and the first threshold voltage $V_{reset}+V_{dp}$ (in case of a positive event) or the second threshold voltage $V_{reset}-V_{dn}$ (in case of a negative event). Therefore, in the above equation, the change $\Delta V_{hold}$ of the hold voltage is equal to either $V_{dp}$ or $-V_{dn}$. Equivalently, one can state that a positive event is generated when the change of light with respect to the previous event corresponds to a change in the photocurrent $\Delta I_{ph}$ such that $\Delta I_{ph}/I_{ph}=V_{dp}/nU_T$, and a negative event is generated when the change of light with respect to the previous event corresponds to a change in the photocurrent $\Delta I_{ph}$ such that $\Delta I_{ph}/I_{ph}=-V_{dn}/nU_T$.

It is therefore possible to define a positive contrast sensitivity $\theta_p$ as $$\theta_p = \frac{V_{dp}}{nU_T}$$

and a negative contrast sensitivity $\theta_n$ as $$\theta_n = \frac{V_{dn}}{nU_T}$$

It shall be noted that the positive contrast sensitivity $\theta_p$ depends on the difference $V_{dp}$ between the reference voltage $V_{reset}$ and the first threshold voltage $V_{reset}+V_{dp}$. In a similar way, the negative contrast sensitivity $\theta_n$ depend on the difference $V_{dn}$ between the reference voltage $V_{reset}$ and the second threshold voltage $V_{reset}+V_{dn}$. Accordingly, the sensitivities may be independently tuned through the respective threshold voltages of the voltage comparators 31, 32.

The exemplary embodiment of FIG. 5 operates in such a way that the photodiode voltage $V_D$ changes from reset to reset. This voltage $V_D$ must change and settle during a short interval (the reset interval). The latency of this settling is dependent on the parasitic capacitance at this node and the available current at this node, which is the photodiode photocurrent $I_{ph}$, typically in the range of femto to pico amps. This low intensity of the photodiode photocurrent $I_{ph}$ means a long settling time.

Figure 6:
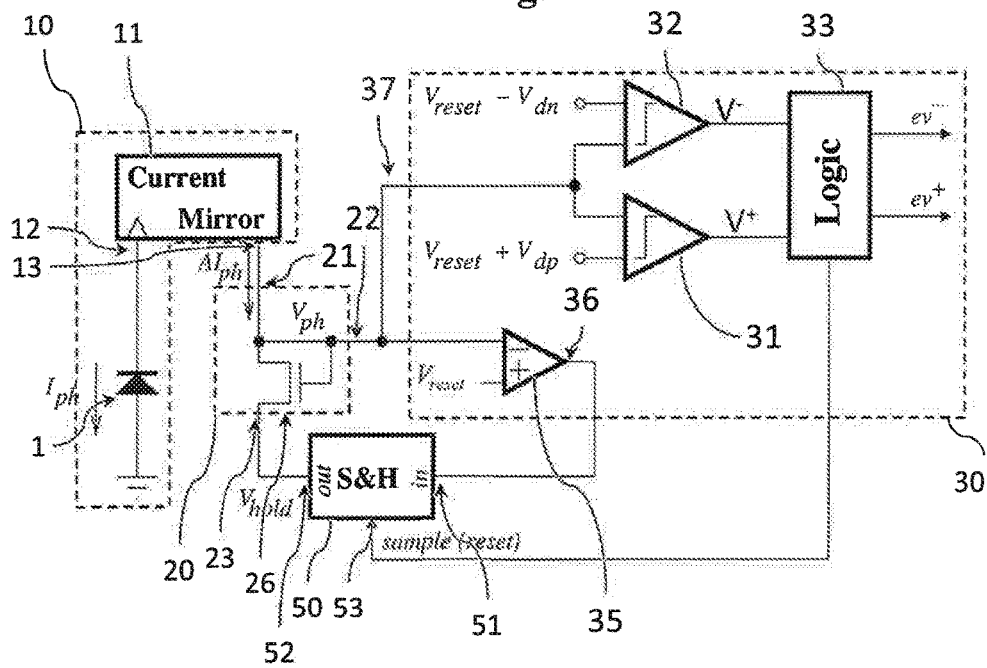

The embodiment depicted on FIG. 6 shows a possible way to avoid settling time limitations of the embodiment of FIG. 5. The photo-sensor stage 10 comprises a current mirror 11 and the converting stage 20 comprises at least one diode-connected transistor 26 connected to said current mirror 11 instead of the transistor 24 and differential amplifier 25 of the converting stage 20 of the embodiment depicted on FIG. 5.

The current mirror 11 has two terminals: a first terminal 12 connected to the photodiode 1, where the photocurrent $I_{ph}$ is imposed by the light exposure of the photodiode 1, and a second terminal 13 where the photocurrent 41, is mirrored with a current gain A, which constitutes the output of the current mirror 11 and of the photo-sensor stage 10. The diode-connected transistor 26 is an N-MOSFET, with one terminal connected to the output 13 of the current mirror 11 constituting the input 21 of the converting stage 20. Connected to the same node is the gate of the transistor, and this node also constitutes the output 22 of the converting stage 20, with the signal voltage $V_{ph}$. The other terminal is connected to the output terminal 52 of the sample-and-hold circuit 50, where the hold voltage $V_{hold}$ appears, and therefore constitutes the second terminal 23 of the converting stage 20. The current gain A introduced by the current mirror 11 before feeding the diode-connected transistor 26 improves the settling time.

Figure 7:
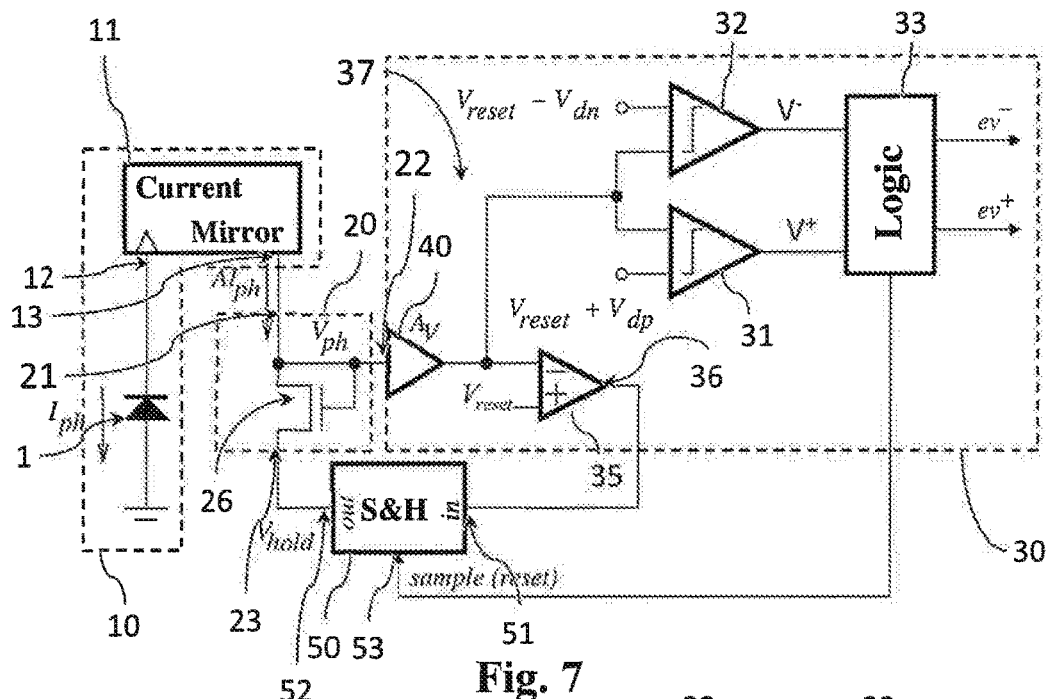

In order to improve contrast sensitivity, voltage amplification may be provided at the output of the converting stage 20 in order to amplify the signal voltage $V_{ph}$ through an amplification stage 40. As shown in FIG. 7, a voltage amplifier 40 is arranged between the output 22 of the converting stage 20 and the node 37 shared by the differential amplifier 35 and the comparators 31, 32 in the comparison stage. The voltage amplifier 40 has a gain A, such that the amplified voltage signal $V_{ph}'$ corresponds to $A_V V_{ph}$. In this case, positive and negative contrast sensitivities are changed to $$\theta_{p/n} = \frac{V_{dp/n}}{A_V nU_T}$$

It shall be understood that in the whole specification, the signal voltage $V_{ph}$ may correspond to the unamplified signal voltage at the output 22 of the converting stage 20 or to the amplified voltage signal $V_{ph}'$ after the amplification at the output 22 of the converting stage 20. In particular, the signal voltage fed to the differential amplifier 35 and to the comparators 31, 32 of the comparison stage 30 may be the amplified signal voltage $V_{ph}'$ as well as the unamplified signal voltage $V_{ph}$, depending on the configuration. In the description below, $V_{ph0}$, $V_{ph1}$, $V_{ph2}$, $V_{ph3}$ will be used to designate the signal voltage $V_{ph}$ at different levels of amplification.

Figure 8:
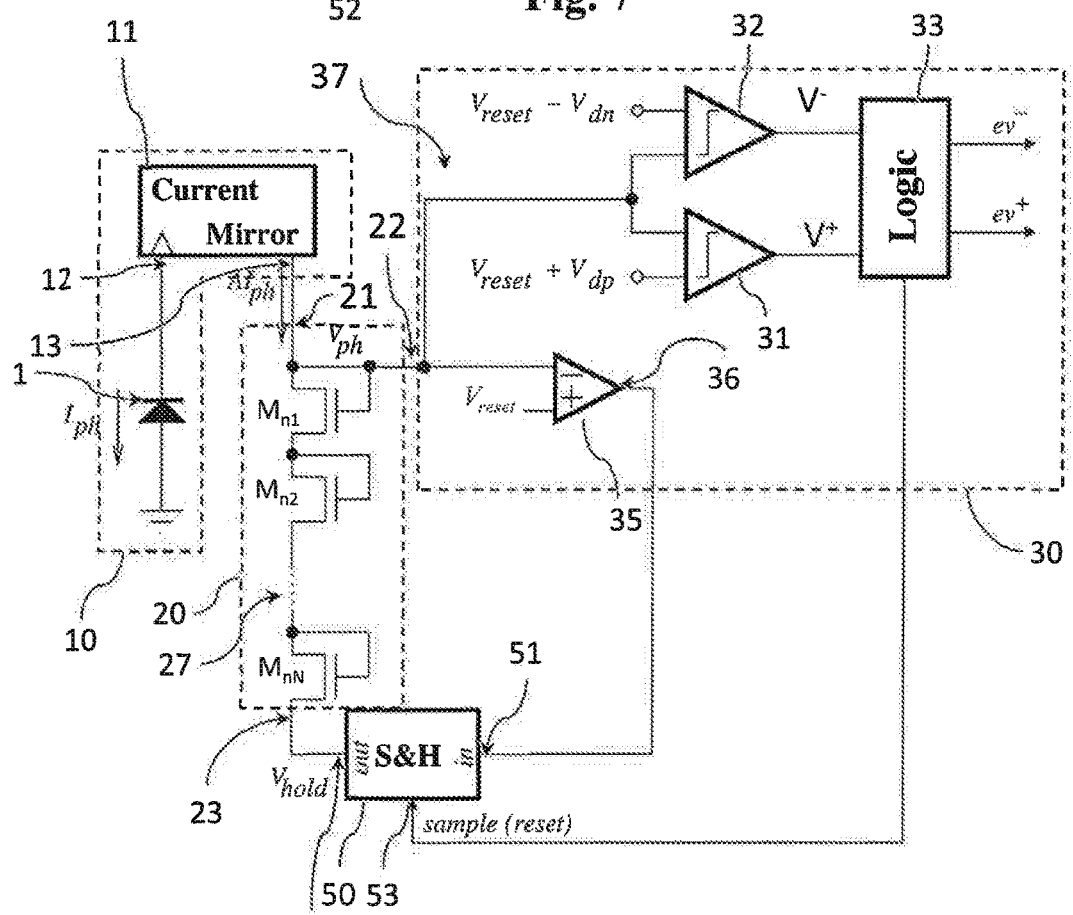

However, in-pixel voltage amplifiers typically suffer from inter-pixel mismatch. One way to introduce a modest mismatch-free amplification is by stacking diode-connected MOS transistors, as illustrated in FIG. 8. The converting stage 20 comprises a series 27 of diode-connected transistors between the output 13 of the photo-sensor stage 10 and the output 52 of the sample-and-hold circuit 50. The first transistor $M_{n1}$ of the series corresponds to the transistor already present in the embodiments of FIGS. 7 and 6. The other transistors $M_{n2}, \ldots M_{nN}$ of the series are connected to one another by their terminals (drains and sources). The last transistor $M_{nN}$ of the series has a terminal connected to the output 52 of the sample-and-hold circuit 50, which constitutes the second terminal 23 of the converting stage 20. As in the depicted case, if there are N stacked diode-connected N-MOSFETs (or P-MOSFETs), the mismatch-free gain introduced is $A_V=N$.

Figure 9:
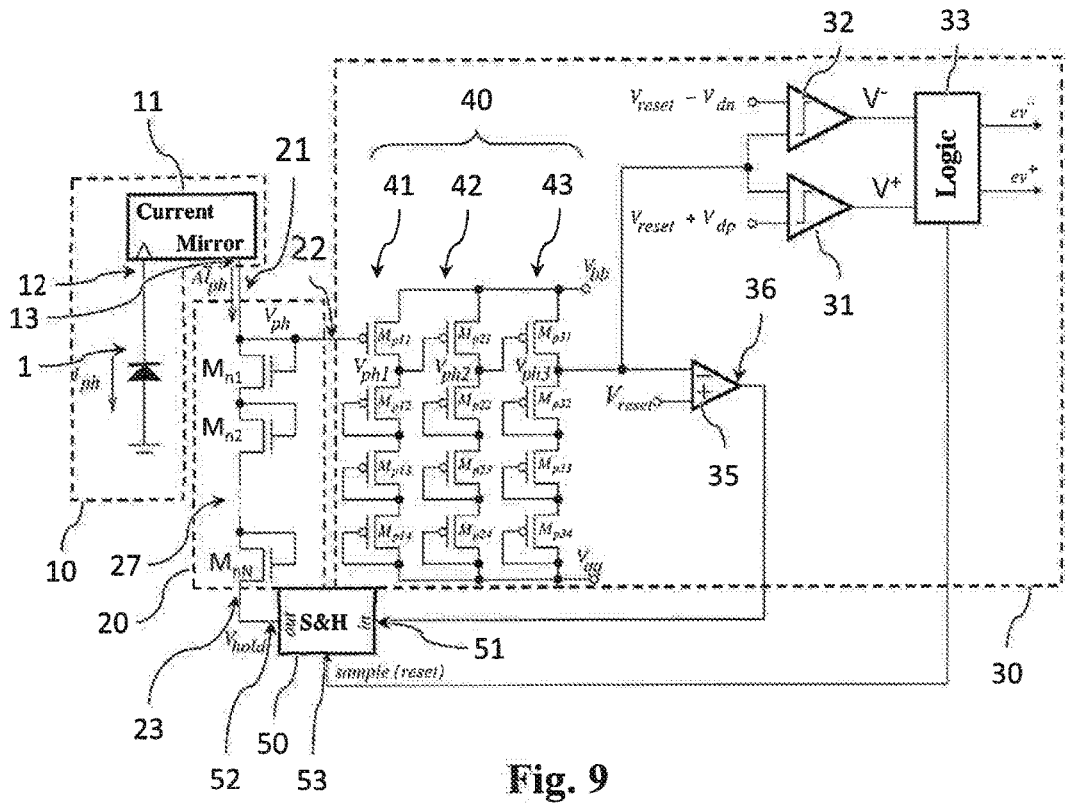

The number of stacked diode-connected transistors $M_{ni}$ is however limited to a small quantity because of limited voltage headroom. Based on the same technique, further amplification can be introduced by cascading several such series in the comparison stage 30 in order to form a voltage amplifier 40. This is illustrated in FIG. 9. The comparison stage 30 comprises at least one first series 41 of diode-connected transistors $Mp_{1j}$ and a second series 42 of diode-connected transistors $Mp_{2j}$, each series 41, 42, 43 of diode-connected transistors $M_{pij}$ having a gate of a first diode-connected transistor $M_{pi1}$ as an input and a drain of said first diode-connected transistor $M_{pi1}$ as an output. In the depicted embodiment, there are three subsequent series 41, 42, 43 of diode-connected transistors. Generic references i and j are used to make refer to the j-th transistor of the i-th column as $M_{pij}$.

For these series 41, 42, 43, the input of one series is connected to the output of the preceding series. One terminal of the first transistors $M_{pi1}$ of every series 41, 42, 43 is connected to a first biasing voltage $V_{bb}$, and one terminal of the last transistors $M_{pi4}$ of every series 41, 42, 43 is connected to a second biasing voltage $V_{qq}$. In other words, each one of the series 41, 42, 43 is connected on one end to the first biasing voltage $V_{bb}$ and the other end to the second biasing voltage $V_{qq}$.

The diode-connected transistors $M_{pij}$ of the series 41, 42, 43 of the comparison stage 30 can be either P-MOSFETs or N-MOSFETs. The biasing voltages $V_{bb}$, $V_{qq}$ are chosen different enough for the transistors $M_{pij}$ of the series 41, 42, 43 of transistors to have an appropriate bias. Preferably, said biasing voltages would be such as to guarantee a desired operating current $I_{qq}$ for the stacked diode-connected transistors $M_{pij}$ of the series 41, 42, 43 while setting the reset level of voltage $V_{ph}$ equal to the reference voltage $V_{reset}$.

Figure 10:
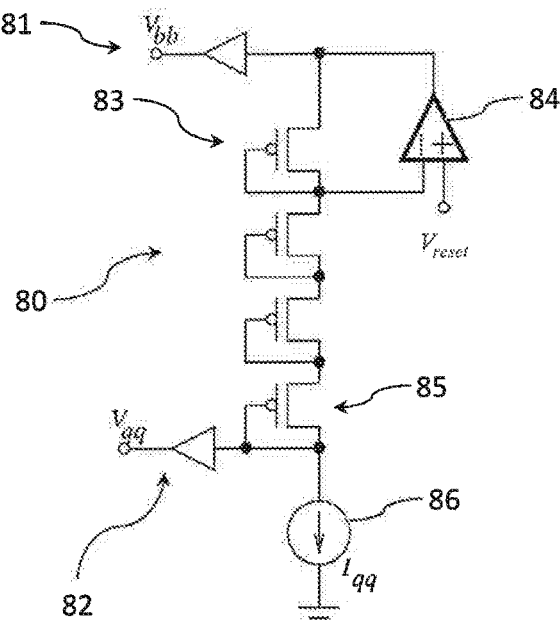
FIGS. 10, 11a and 11b illustrate schematic diagrams for possible biasing circuits for stacked diode-connected transistors such as in FIG. 9.

This can be achieved by using at the periphery of the pixel array a biasing circuit similar to the one shown in FIG. 10 which generates appropriate values for the biasing voltages $V_{bb}$ and $V_{qq}$, as function of the operating current $I_{qq}$ and the reference voltage $V_{reset}$. A series 80 of P-MOS diode-connected transistors is arranged between the terminals 81, 82 where the biasing voltages $V_{bb}$ and $V_{qq}$ are generated, respectively. N-MOS transistors could also be used, or combined PMOS diode-connected with NMOS non-diode-connected or conversely. The gate and drain of the first transistor 83 of the series 80, i.e. the transistor closest to the terminal 81 where the higher biasing voltage $V_{bb}$ is generated, are connected together to an inverting input of a differential amplifier 84. The reference voltage $V_{reset}$ is applied to the non-inverting input of the differential amplifier 84. The gate and drain of the last transistor 85 of the series 80, i.e. the transistor closest to the terminal 82 where the lower biasing voltage $V_{qq}$ is generated are connected to a current source 86 delivering the operating current $I_{qq}$.

Figure 11A:
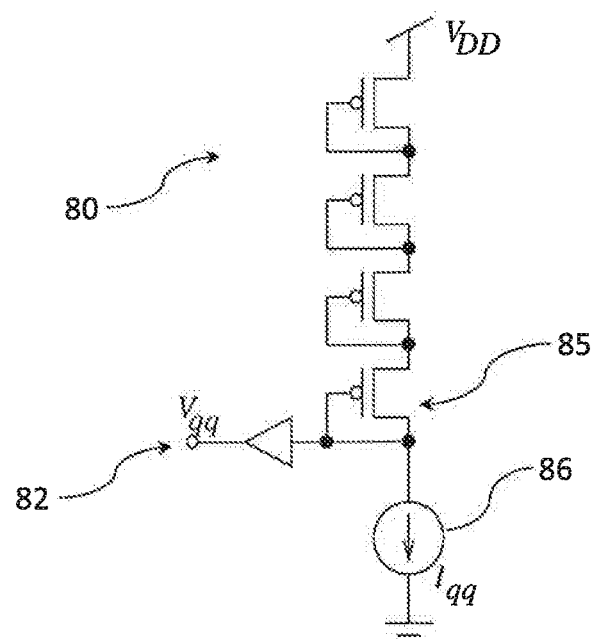
Figure 11B:
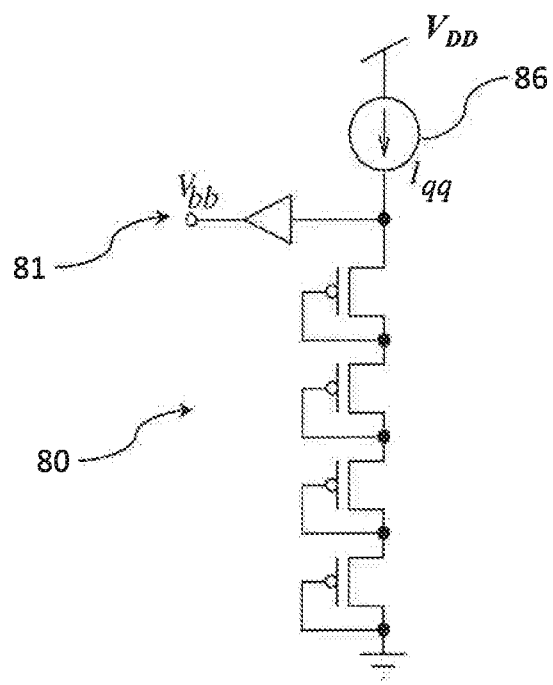

It shall be noted that there is no requirement for using both biasing voltages $V_{bb}$ and $V_{qq}$. It is possible to use just one of them, and to connect the other one to the power supply $V_{DD}$ or to the ground. FIG. 11a shows an example of a biasing circuit that only delivers the biasing voltage $V_{qq}$. As in FIG. 10, there is still a series 80 of P-MOS diode-connected transistors, however connected to the power supply voltage $V_{DD}$ on one end, without any differential amplifier 84. The other end is similar to FIG. 10, with the gate and drain of the last transistor 85 of the series 80, i.e. the transistor closest to the terminal 82 where the lower biasing voltage $V_{qq}$ is generated, connected to a current source 86 delivering the operating current $I_{qq}$. FIG. 11b shows an example of a biasing circuit that only delivers the biasing voltage $V_{bb}$. In this case, the series 80 of P-MOS diode-connected transistors is connected to the ground on one end, and on the other end is connected to a terminal 81 where the biasing voltage $V_{bb}$ is generated, possibly through an amplifier, and to a current source 86 connected to the power supply $V_{DD}$.

With the series 41, 42, 43 of the diode-connected transistors $M_{pij}$ arranged as shown in FIG. 9, the already amplified signal voltage $V_{ph0}$ is received by the gate of the first transistor $M_{p11}$ of the first series. The amplified signal voltage $V_{ph1}$ at the node between the first transistor $M_{p11}$ and the second transistor $M_{p12}$ of the first series 41 is the output of the first series 41 which is fed to as an input of the second series 42 to the gate of the first transistor $M_{p21}$ of the second series 42. The amplified signal voltage $V_{ph2}$ at the node between the first transistor $M_{p21}$ and the second transistor $M_{p22}$ of the second series 42 is the output of the second series 42 which is fed to as an input of the third series 43 to the gate of the first transistor $M_{p31}$ of the third series 43. The amplified signal voltage $V_{ph3}$ at the node between the first transistor $M_{p31}$ and the second transistor $M_{p32}$ of the third series 43 is the output of the third series 43, which is send to the inverting input of the differential amplifier 35 of the comparison stage 30 and to the comparators 31, 32.

This solution allows higher voltage amplification without requiring high voltage headroom. For example, if the series 27 of diode-connected transistors of the converting stage 20 includes N stacked diode-connected transistors, and each of the three series 41, 42, 43 of the comparator stage contains four diode-connected transistors, the overall voltage amplification introduced in this case is $A_V=N\times4\times4\times4=64\,N$.

Figure 12:
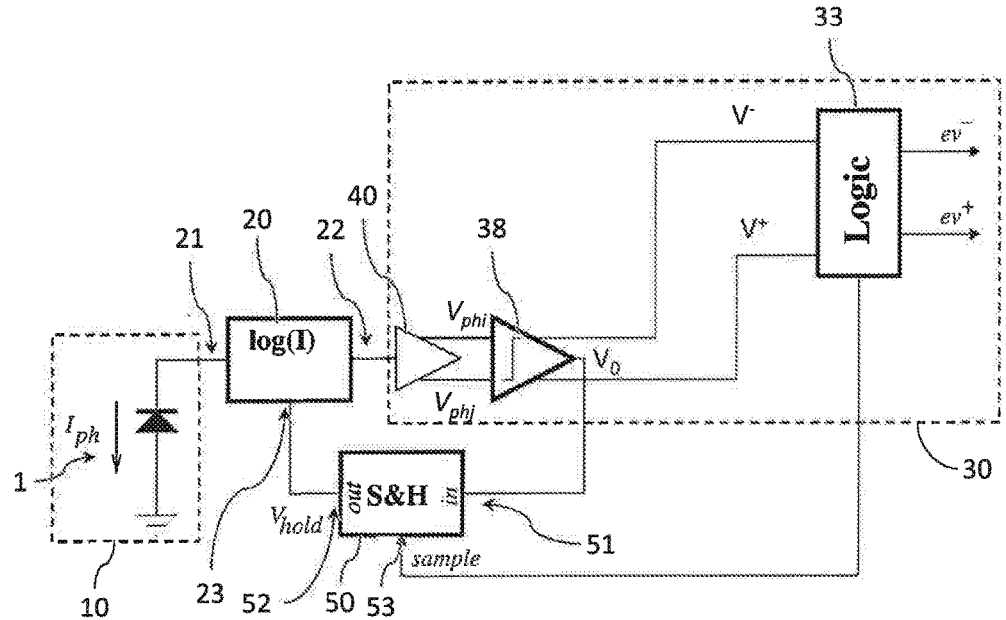
FIGS. 12 and 13 illustrate schematic diagrams of a pixel circuit according to possible embodiments of the invention using a multiple-output differential comparator.

Cascading stacked series 41, 42, 43 of diode-connected transistors $M_{pij}$ may however suffer from small mismatch. Interestingly, the difference of voltage between consecutive series 41, 42, 43 of diode-connected transistors $M_{pij}$ provides a larger amplification and suffers from even smaller mismatch. This can be exploited by using a differential comparator with multiple shifted outputs fed with two differently amplified signal voltage $V_{phi}$, $V_{phj}$ as illustrated in FIG. 12.

In this embodiment, the comparison stage 30 comprises a differential comparator, preferably multiple-output differential comparator 38 with multiple shifted outputs, said differential comparator 38 having as inputs two differently amplified values $V_{phi}$, $V_{phj}$ of the signal voltage, and being configured for outputting the input signal $V_0$ for the input 51 of the sample-and-hold circuit 50 and for comparing the difference of the inputs against at least one threshold voltage.

It is to be noted that according to the present invention, differential comparator in particular embodiments can be multiple-output differential comparator; for example differential comparator 38 is preferably multiple-output differential comparator.

More precisely, a first amplified signal voltage $V_{phi}$ is applied to an inverting input of the differential comparator 38, a second amplified signal voltage $V_{phj}$ is applied to a non-inverting input of the differential comparator 38, and the differential comparator 38 has at least three outputs.

A first output $V^+$ transitions when the second amplified signal voltage $V_{phi}$ and the first amplified signal voltage $V_{phi}$ differ by a positive threshold voltage $V_{dp}$. The first output $V^+$ is fed to a logic circuitry 33 that emits a positive event signal $ev^+$ when the first output $V^+$ transitions.

A second output $V^-$ that transitions when the second amplified signal voltage $V_{phj}$ and the first amplified signal voltage $V_{phi}$ differ by a negative threshold voltage $V_{dn}$. The second output $V^-$ is fed to a logic circuitry 33 that emits a positive event signal $ev^-$ when the second output $V^-$ transitions.

A third output $V_0$ is the input signal for the input 51 of the sample-and-hold circuit 50 and transitions when the second amplified signal voltage $V_{phj}$ and the first amplified signal voltage $V_{phi}$ are equal.

Figure 13:
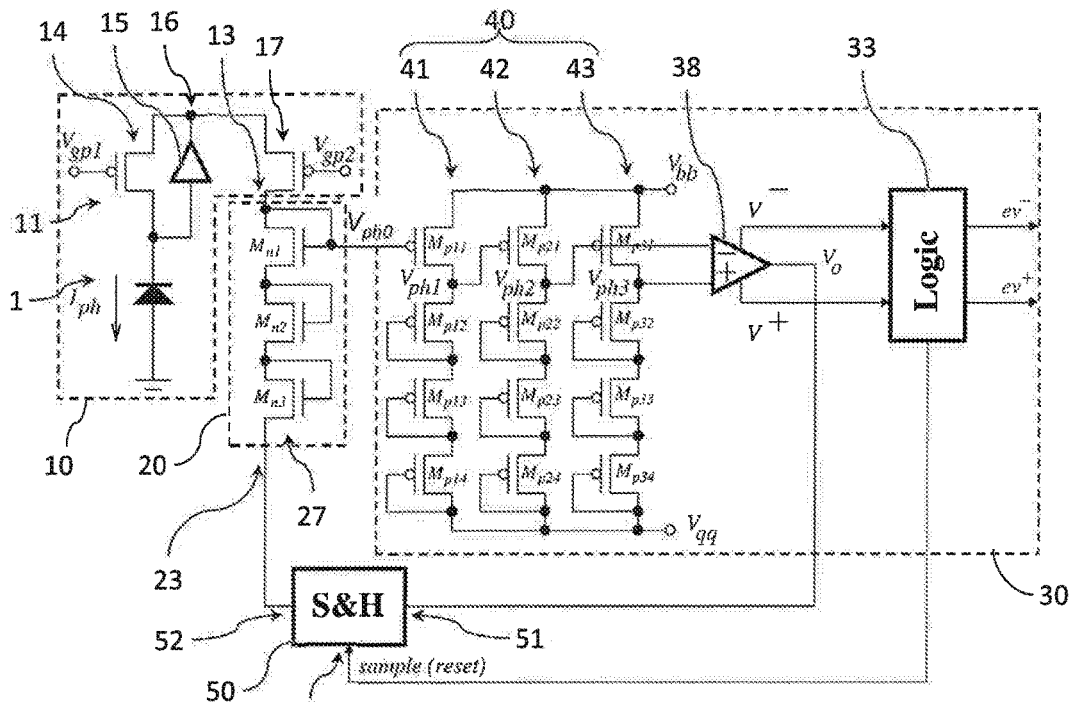
Figure 14:
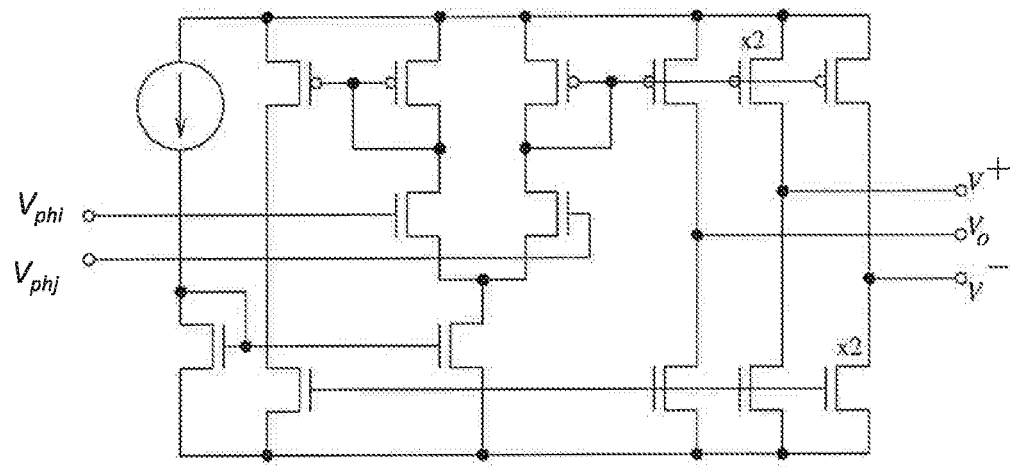
FIG. 14 illustrates a schematic diagram of a possible circuit implementation for a multiple-output differential comparator.

A particularly advantageous embodiment of the invention is shown in FIG. 13, exploiting the series 41, 42, 43 of diode-connected transistors $M_{pij}$ of the voltage amplifier 40 discussed in relation with FIG. 9. According to this embodiment, the comparison stage 30 comprises at least two series 41, 42, 43 of diode-connected transistors $M_{pi}$, each series 41, 42, 43 of diode-connected transistors having a gate of a first diode-connected transistor $M_{pi1}$ as an input and a drain of said first diode-connected transistor $M_{pi1}$ as an output. The output of the first transistor $M_{p21}$ of a series 42 of diode-connected transistors is the first amplified signal voltage $V_{ph2}$ applied to the inverting input of the differential comparator 38. The output of the first transistor $M_{p31}$ of another series 43 of diode-connected transistors is the second amplified signal voltage $V_{ph3}$ applied to the non-inverting input of the differential comparator 38. The non-inverting input if the differential comparator 38 receives the amplified signal voltage $V_{ph3}$ from the series 43 that receives as an input the amplified signal voltage $V_{ph2}$ fed to the inverting input of differential comparator 38. A possible implementation for the multiple-output differential comparator 38 is shown on FIG. 14.

Figure 15:
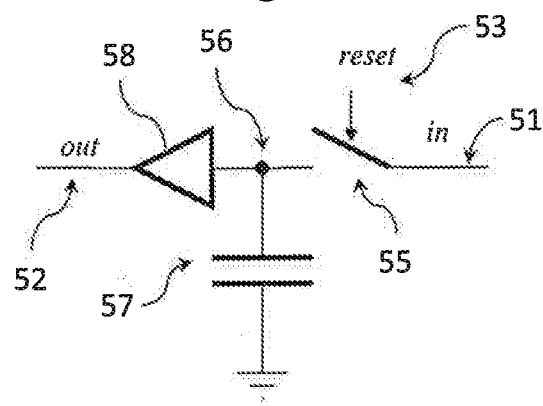
FIGS. 15-17 are schematic diagrams of possible sample-and-hold circuits for pixel circuits according to possible embodiments of the invention.
Figure 16:
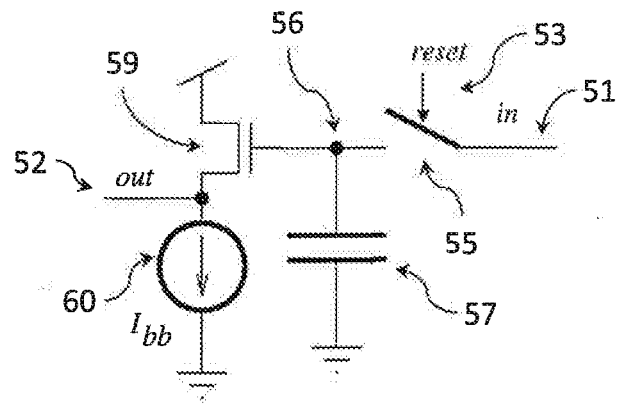

FIG. 13 also shows the details of an example of current mirror 11 that may be used in other configurations. The input 12 of the current mirror 11 is connected to the photodiode 1. A transistor 14 gate-biased by a biasing voltage $V_{gp1}$ is connected in parallel to an amplifier 15 between the input 12 and a common node 16. To the common node are also connected the sources of a transistor 17 biased by another biasing voltage $V_{gp2}$. The drain of the transistor 17 corresponds to the terminal 13 connected to the converting stage 20. FIG. 15 shows a possible simple circuit implementation for the sample-and-hold circuit 50 that can be used. A switch 55 controlled by the control terminal 53 has one terminal connected to the input 51 of the sample-and-hold circuit 50, and another terminal connected to a node 56. A capacitor 57 is connected between said node 56 and the ground. A voltage buffer 58 is connected between the node 56 and the output 52 of the sample-and-hold circuit 50. As shown in FIG. 16, the buffer 58 may be a simple voltage follower, with a transistor 59 whose gate is connected to the node 56 and a current source 60 delivering a current $I_{bb}$ between the terminal of the transistor and the ground. The output 52 of the sample-and-hold circuit 50 is then between the transistor 59 and the current source 60.

Figure 17:
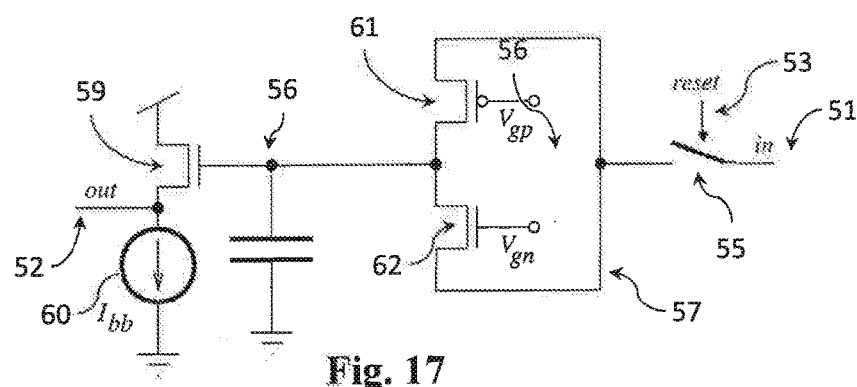

In order to avoid parasitic switch charge injection effects, the switch 55 can be implemented by means of charge-pumps, as illustrated by FIG. 17. The switch 55 is followed by two MOS transistors 61, 62 biased respectively by a biasing voltage $V_{gp}$ (for the P-MOS) and by a biasing voltage $V_{gn}$ (for the N-MOS) having a common drain and a common source. The common source is connected to the switch 55, and the common drain is connected to the common node 56.

It shall be noted that in FIG. 17, the value of the current $I_{bb}$ should be large enough to provide enough current to the voltage follower and to the series 27 of stacked diode-connected transistors $M_{ni}$ of the converting stage 20 for the situation of maximum photocurrent (with current amplification A by the current mirror 11). This may force to set the current $I_{bb}$ to a relatively large value to account for the worst case situation. However, this might impose a high power consumption which is usually not required under normal conditions.

Figure 18:
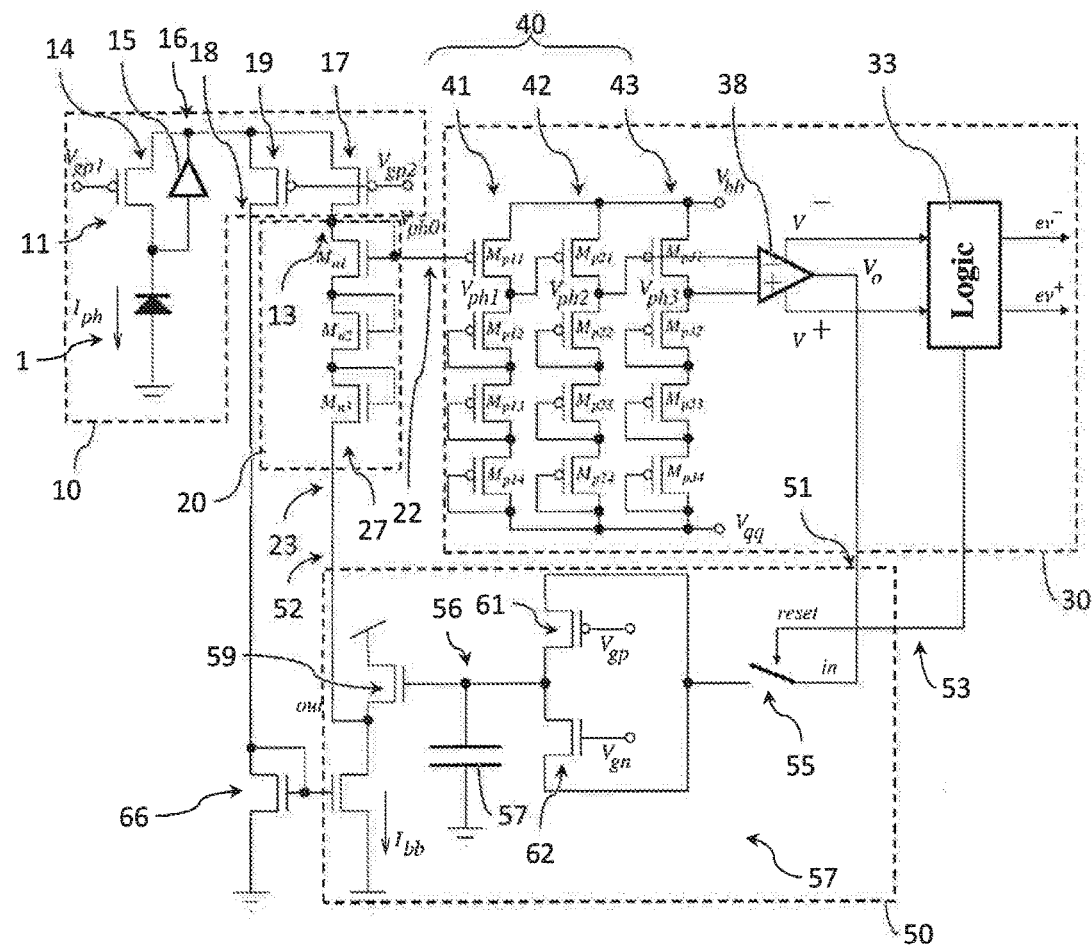
FIG. 18 illustrates a schematic diagram of a pixel circuit according to a possible embodiment of the invention, using the sample-and-hold circuit of FIG. 17 and implementing an adaptive biasing.

To overcome this, FIG. 18 shows an improved arrangement for an adaptive biasing of current $I_{bb}$ dependent on the illumination level. To this end, the current mirror 11 comprises an additional terminal 18 in addition to the terminal 13 connected to the input 21 of the converting stage. The configuration of the current mirror 11 is the same for both terminals 13, 18. The additional terminal 18 is connected to the sample-and-hold circuit 50, and feeds a current mirror 66 acting as a current source 60 with a replica of the amplified photo-current $I_{ph}$ of terminal 13. The current mirror 66 replicates the instantaneous photo-current $I_{ph}$ amplified by current mirror 11 of gain A on terminal 18 to give the current $I_{bb}$, which consequently corresponds to $AI_{ph}$. The current $I_{bb}$ is therefore always adapted to the illumination level. In this example, the current mirror 11 is similar to the current mirror of FIG. 13, but for the additional terminal 18 and a transistor 19 connecting the common node 16 to said additional terminal. The transistor 19 is gate-biased by the same voltage $V_{gp2}$ as transistor 17.

If the gain of the current mirror 66 is B, then $I_{bb}$=AB $I_{ph}$, and $$V_{ph}=V_C+K+nU_T(N-1)\log(I_{ph}/I_0)$$

Where $V_C$ is the voltage at capacitor 57, $K=nU_T \log(A^{N-1}/(B-1))$, and N is the number of stacked diode connected MOS transistors of series 27. Note that this adaptive biasing reduces the voltage gain from N to N−1.

Furthermore, it should be noticed that it is possible to make N=0, resulting in $$V_{ph}=V_C-nU_T\log(ABI_{ph}/I_0)$$

Figure 19:
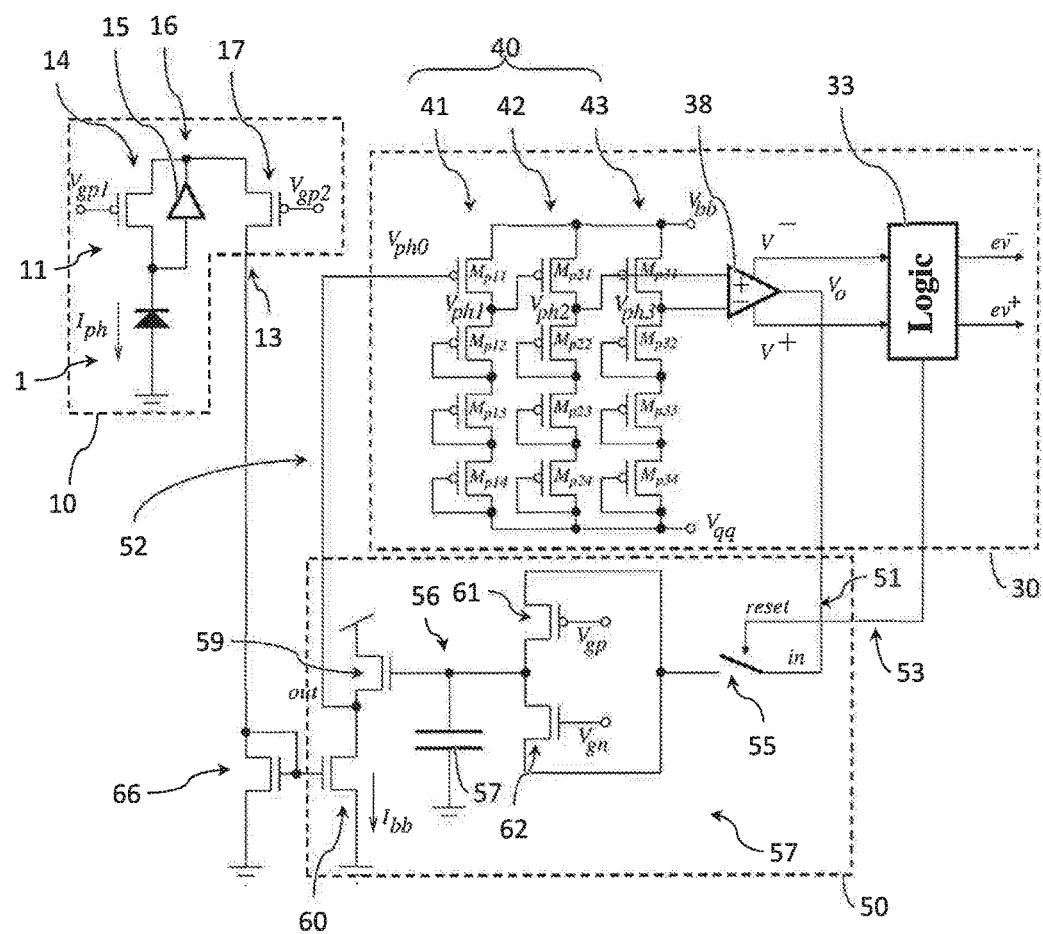
FIG. 19 illustrates a schematic diagram of a pixel circuit according to a possible embodiment of the invention without a series of transistors between the photo-sensor stage and the sample-and-hold circuit.

The physical implementation results in suppressing the series 27 together with current mirror output transistor 17. FIG. 19 shows an example of a pixel circuit similar to the pixel circuit of FIG. 18, but without the series 27 or current mirror output transistor 17. The signal voltage $V_{ph0}$ is delivered to the comparison stage 30 directly by the output 52 of the sample-and-hold circuit 50, The output 52 of the sample-and-hold circuit 50 is thus connected to the gate of a transistor of the first series 41 of the voltage amplifier 40. In a sense, the sample-and-hold circuit 50 stage acts as the converting stage 20, since the output 52 of the sample-and-hold circuit 50 delivers a signal voltage $V_{ph}$ derived from said photoreceptor current $I_{ph}$ to the comparison stage 30. The output 13 of the photo-sensor stage 10 may thus correspond to the output 22 of the converting stage 20.

It is also possible to use the output voltage $V_{hold}$ at the output 52 of the sample-and-hold block 50 to shift the input offset voltage of the series 41, 42, 43 of diode connected transistors of the voltage amplifier 40 of the comparison stage 30. To this end, the output 52 of the sample-and-hold block 50 is connected to the lower terminal 45 of the first series 41 of diode-connected transistors, i.e. instead of $V_{qq}$ or the ground.

In the example shown, the low voltage end 45, 46, 47 of each one of the series 41, 42, 43 of diode connected transistors is completed with an N-MOS transistor $M_{n14}$, $M_{n24}$, $M_{n34}$. The output 13 of the photo-sensor stage 10 is directly connected to the comparison stage 30. More precisely, the output 13 of the photo-sensor stage 10 is connected to a gate of the transistor $M_{n14}$ completing the first series 41 at its lower end 45. The output 52 of the sample-and-hold circuit 50 is connected to the source of said transistor $M_{n14}$. As a result, the transistor $M_{n14}$ receives a signal voltage $V_{ph}$ derived from said photoreceptor current $I_{ph}$ to its gate and the hold voltage $V_{hold}$ at its source, its drain being connected to the drain and gate of the bottom transistor $M_{p13}$ of the first series 41. The other transistors $M_{n24}$ and $M_{n34}$ have their gates connected to the drains of the N-MOS transistor $M_{n14}$, $M_{n24}$ of the preceding series 41, 42, and their sources connected to the second biasing voltage $V_{qq}$.

The inverting input of the differential comparator 38 is connected to the drain of the N-MOS transistor $M_{n34}$ completing the last series 43 of diode-connected transistors, and the non-inverting input of the differential comparator 38 is connected to the drain of the N-MOS transistor $M_{n24}$ completing the preceding series 42.

As is apparent for the skilled person, different combinations of PMOS and NMOS type transistors within the series 41, 42, 43 are possible.

It is also possible to connect the output 52 of the sample-and-hold block 50 is to the upper terminal of the first series 41 of diode-connected transistors, i.e. instead of $V_{DD}$ or $V_{bb}$, rather than connecting it to the lower end 45 of the first series 41.

Figure 20A:
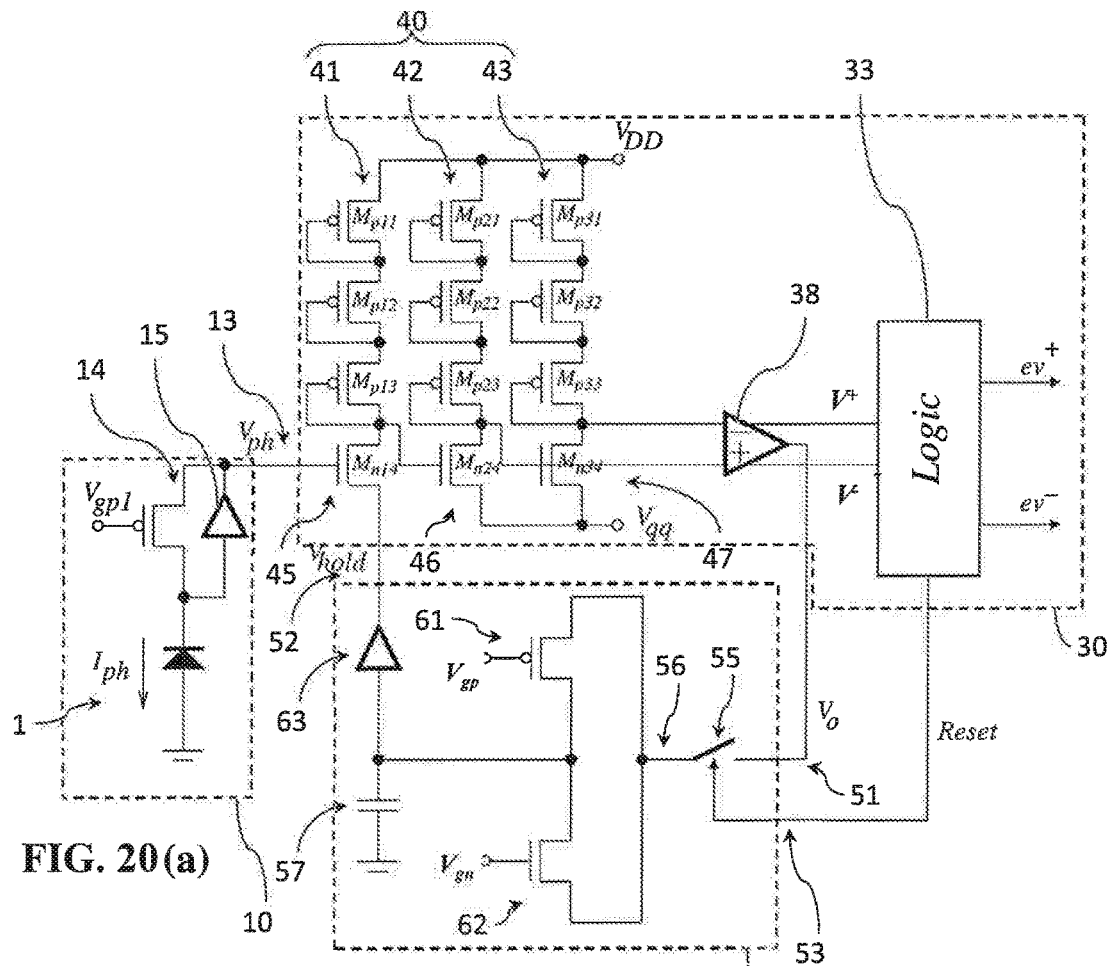
FIG. 20a illustrates a schematic diagram of a pixel circuit according to a possible embodiment of the invention, with both the photo-sensor stage and the sample-and-hold circuit directly connected to the comparison stage.
Figure 20B:
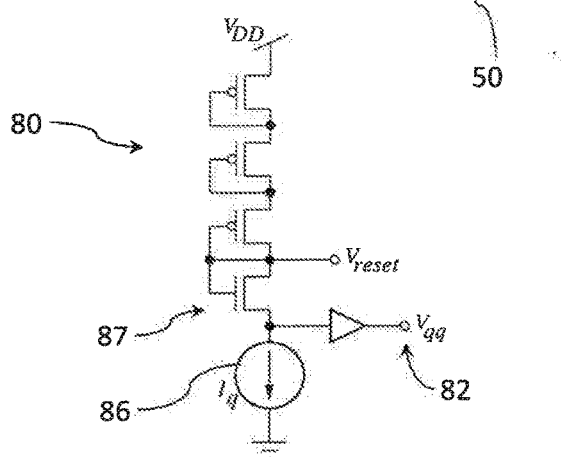

FIG. 20(*b*) shows an example of a possible biasing circuit for generating the second biasing voltage $V_{qq}$ that can be used in FIG. 20*a*. As in FIG. 11*a*, there is a series 80 of P-MOS diode-connected transistors. However, the lower voltage end of the series is completed with a N-MOS transistor 87 which is also diode-connected, and has its source connected both to the terminal 82 where the lower second biasing voltage $V_{qq}$ is generated and to the current source 86.

It shall be noted that there is current mirror 66 or transistor 59 as in FIG. 17, Instead, the hold voltage $V_{hold}$ is delivered at the output 52 from the capacitor 57 through an amplifier 63 connected between the capacitor 57 and the output 52.

While the present invention has been described with respect to certain preferred embodiments, it is obvious that it is in no way limited thereto and it comprises all the technical equivalents of the means described and their combinations. In particular, it will be apparent to those skilled in the art that various changes and modifications may be made without departing from the scope of the invention as defined in the appended claims.

The invention claimed is:

1. A pixel circuit comprising:
a photo-sensor stage comprising a photodiode and having an output, said photo-sensor stage configured for delivering a photoreceptor current dependent on a light intensity of an exposure of said photodiode, and
a comparison stage configured for detecting a change in a signal voltage derived from said photoreceptor current, characterised in that the pixel circuit comprises a sample-and-hold circuit having an input, an output, and a control terminal, the output of said sample-and-hold circuit connected to an input of the comparison stage, and the comparison stage is configured to output an input signal for the input of the sample-and-hold circuit,
wherein the control terminal of the sample-and-hold circuit is connected to the comparison stage, said comparison stage configured for emitting a sampling signal to the control terminal of the sample-and-hold circuit when the change is detected in the signal voltage.

2. The pixel circuit according to claim 1, wherein the sample-and-hold circuit is configured for sampling the input signal at the input of said sample-and-hold circuit when the comparison stage emits the sampling signal to the control terminal of the sample-and-hold circuit, and for holding a hold voltage when the comparison stage does not emit the sampling signal to the control terminal of the sample-and-hold circuit.

3. The pixel circuit according to claim 2, wherein the sample-and-hold circuit is configured so that the hold voltage at the output of said sample-and-hold circuit follows the input signal at the input of said sample-and-hold circuit when the sampling signal is received at the control terminal of the sample-and-hold circuit.

4. The pixel circuit according claim 1, wherein the comparison stage is configured for comparing the signal voltage against at least one threshold voltage, and the comparison stage is configured for emitting the sampling signal to the control terminal of the sample-and-hold circuit on the basis of the comparison between the signal voltage and said at least one threshold voltage.

5. The pixel circuit of claim 4, wherein the comparison stage is configured for comparing the signal voltage against a first threshold voltage and a second threshold voltage, said first threshold voltage being greater than said second threshold voltage, and for outputting a first signal event signal when the signal voltage exceeds the first threshold voltage and for outputting a second event signal when the signal voltage is inferior to the second threshold voltage.

6. The pixel circuit of claim 1, wherein the comparison stage comprises a differential amplifier configured to compare the signal voltage to a reference voltage and to output hg input signal for the input of the sample-and-hold circuit on the basis of a comparison.

7. The pixel circuit of claim 1, wherein the comparison stage comprises a differential comparator with multiple shifted outputs, said differential comparator having two inputs for inputting two differently amplified values of the signal voltage, and being configured for outputting the input signal for the input of the sample-and-hold circuit and for comparing the difference of the two inputs with at least one threshold voltage.

8. The pixel circuit of claim 7, wherein a first amplified signal voltage is applied to an inverting input of the differential comparator, a second amplified signal voltage is applied to a non-inverting input of the differential comparator, and the differential comparator has at least three outputs:
a first output that transitions when the second amplified signal voltage and the first amplified signal voltage differ by a positive threshold voltage,
a second output that transitions when the second amplified signal voltage and the first amplified signal voltage differ by a negative threshold voltage, and
a third output is the input signal for the input of the sample-and-hold circuit and transitions when the first amplified signal voltage and the second amplified signal voltage are equal.

9. The pixel circuit according to claim 1, wherein the comparison stage comprises at least one series of diode-connected transistors, each series of diode-connected transistors having a gate of a first diode-connected transistor as an input and a drain of said first diode-connected transistor as an output.

10. The pixel circuit according to claim 9, wherein the at least one series of diode-connected transistors is arranged between a first terminal configured to apply a first biasing voltage and a second terminal configured to apply a second biasing voltage, and wherein the pixel circuit comprises a biasing circuit for generating at an output terminal at least one biasing voltage among the first biasing voltage and the second biasing voltage, said biasing circuit comprising:
a current source connected to the output terminal, and
a series of diode-connected transistors connected to the current source and the output terminal.

11. The pixel circuit according to claim 10, wherein the series of diode-connected transistors is arranged between the first terminal and the second terminal, and the current source is connected to the second terminal, and the biasing circuit further comprises a differential amplifier having a inverting input, a non-inverting input and an output, said inverting input connected to a drain of a transistor of said series of diode-connected transistors, a reference voltage applied to said non-inverting input and the output connected to the first terminal.

12. The pixel circuit according to claim 1, wherein the comparison stage comprises at least one first series of diode-connected transistors and a second series of diode-connected transistors, each series of diode-connected transistors having a gate of a first diode-connected transistor as an input and a drain of said first diode-connected transistor as an output, and wherein the comparison stage comprises a differential comparator with multiple shifted outputs, a first input of the differential amplifier being the output of the first transistor of a series of diode-connected transistors and a second input for the differential amplifier being the output of the first transistor of another series of diode-connected transistors.

13. The pixel circuit according to claim 9, wherein the output of the sample-and-hold circuit is connected to a gate of a transistor of the first series of diode-connected transistors.

14. The pixel circuit according to claim 9, wherein the output of the sample-and-hold circuit is connected to the source of a transistor arranged at an end of the first series of diode-connected transistors, and wherein the output of the photo-sensor stage is connected to the gate of said transistor.

15. The pixel circuit according to claim 1, wherein the pixel circuit comprises a converting stage having at least an input connected to the output of the photo-sensor stage and a first terminal, said converting stage configured for delivering on the first terminal the signal voltage derived from said photoreceptor current, and the converting stage has at least a second terminal and the output of said sample-and-hold circuit is connected to the second terminal of the converting stage, said converting stage being an input for the comparison stage.

16. The pixel circuit according to claim 15, wherein the second terminal of the converting stage is configured for controlling a voltage shift at the first terminal of the converting stage through a hold voltage applied by the sample-and-hold circuit at the output of said sample-and-hold circuit.

17. The pixel circuit according to claim 15, wherein the photo-sensor stage comprises a current mirror and the converting stage comprises at least one diode-connected transistor connected to said current mirror.

18. The pixel circuit according to claim 15, wherein the converting stage comprises a series of diode-connected transistors between the output of the photo-sensor stage and the output of the sample-and-hold circuit.

19. An image sensor comprising a plurality of pixel circuits according to claim 1.

20. The pixel circuit according to claim 12, wherein the output of the sample-and-hold circuit is connected to a gate of a transistor of the first series of diode-connected transistors, or is connected to the source of a transistor arranged at an end of the first series of diode-connected transistors and the output of the photo-sensor stage is connected to the gate of said transistor.

* * * * *